(12) United States Patent
Lan

(10) Patent No.: US 10,795,220 B2
(45) Date of Patent: Oct. 6, 2020

(54) GRAPHENE TRANSPARENT CONDUCTIVE FILM AND METHOD FOR MANUFACTURING THE SAME

(71) Applicant: Shenzhen China Star Optoelectronics Technology Co., Ltd., Shenzhen, Guangdong (CN)

(72) Inventor: Song Lan, Guangdong (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 349 days.

(21) Appl. No.: 15/500,117

(22) PCT Filed: Jan. 17, 2017

(86) PCT No.: PCT/CN2017/071349
§ 371 (c)(1),
(2) Date: Dec. 7, 2017

(87) PCT Pub. No.: WO2018/120334
PCT Pub. Date: Jul. 5, 2018

(65) Prior Publication Data
US 2019/0384086 A1      Dec. 19, 2019

(30) Foreign Application Priority Data
Dec. 30, 2016   (CN) .......................... 2016 1 1252503

(51) Int. Cl.
*G02F 1/1343* (2006.01)
*C01B 32/194* (2017.01)
(Continued)

(52) U.S. Cl.
CPC ........ *G02F 1/13439* (2013.01); *C01B 32/194* (2017.08); *H01B 1/04* (2013.01);
(Continued)

(58) Field of Classification Search
CPC ............... C01B 2204/22; C01B 32/194; C01P 2006/40; G02F 1/13439; G02F 1/1337;
(Continued)

(56) References Cited

U.S. PATENT DOCUMENTS

| | | | |
|---|---|---|---|
| 2010/0065788 A1* | 3/2010 | Momose | .............. C08G 18/673 252/511 |
| 2012/0049239 A1* | 3/2012 | Sung | ........................ H01B 1/04 257/103 |
| 2017/0018327 A1* | 1/2017 | Konagaya | ................ H01B 1/24 |

FOREIGN PATENT DOCUMENTS

JP          2013035966 A  *  2/2013

* cited by examiner

*Primary Examiner* — Sophie Hon

(57) ABSTRACT

A graphene transparent conductive film is disclosed. The graphene transparent conductive film includes graphene and a vertical alignment agent. A method for manufacturing the graphene transparent conductive film is further disclosed. In the method, graphene, a surfactant, and water are mixed to obtain a graphene solution; a vertical alignment agent is added to the graphene solution to obtain a graphene transparent conductive film liquid, and the film liquid is coated on a substrate and heated to obtain the graphene transparent conductive film. The vertical alignment agent can reduce a surface energy of liquid crystal molecules in a polymer matrix, increase a contact angle, so that the liquid crystal molecules can be aligned vertically.

7 Claims, 1 Drawing Sheet

(51) Int. Cl.
*H01B 1/04* (2006.01)
*H01B 5/14* (2006.01)
*H01B 13/00* (2006.01)

(52) U.S. Cl.
CPC ........... *H01B 5/14* (2013.01); *H01B 13/0036* (2013.01); *C01B 2204/22* (2013.01); *C01P 2006/40* (2013.01); *Y10T 428/1009* (2015.01)

(58) Field of Classification Search
CPC ....... G02F 2001/133742; H01L 313/00; H01L 313/0036; H01L 1/04; H01L 5/14; C09K 19/56; Y10T 428/1009
See application file for complete search history.

GRAPHENE TRANSPARENT CONDUCTIVE FILM AND METHOD FOR MANUFACTURING THE SAME

CROSS REFERENCE TO RELATED APPLICATIONS

The present application claims the priority of Chinese patent application CN201611252503.3, entitled "Graphene transparent conductive film and method for manufacturing the same" and filed on Dec. 30, 2016, the entirety of which is incorporated herein by reference.

FIELD OF THE INVENTION

The present disclosure relates to the technical field of liquid crystal display device, and particularly to a graphene transparent conductive film and a method for manufacturing the same.

BACKGROUND OF THE INVENTION

A thin film transistor liquid crystal display (TFT-LCD) generally comprises a color filter (CF) substrate, a TFT substrate, as well as polyimide (PI) material, liquid crystal material, and frame material that are arranged between the CF substrate and the TFT substrate. Under a commonly used vertical alignment (VA) display mode, a transparent conductive film should be coated on the CF substrate and the TFT substrate. The main role of the transparent conductive film is to form an electric field between the CF substrate and the TFT substrate, so that liquid crystal molecules can deflect and image display can be realized.

At present, as a traditional transparent conductive film, an Indium Tin Oxide (ITO) film is formed through a Physical Vapor Deposition (PVD) method. In a PVD apparatus, an ITO target is bombarded by a strong electric current, and a transparent conductive ITO film can be deposited on a substrate. However, the ITO film cannot be bent under an external force due to the physical property itself, which limits its use in flexible panel and wearable device. In addition, the cost of indium rises gradually because of the guidance of national policy. Therefore, it is important to search a new product with a high electric conductivity, a high light transmittance, a simple preparing method, and a rich storage to replace ITO.

The CF substrate and the TFT substrate of an LCD both are provided with a thin film material, a main role of which is enabling the liquid crystal molecules to be aligned in a certain direction. The thin film is called as alignment film and is generally made of polyimide (PI) material. The alignment film is mainly made of rubbing alignment PI material and optical alignment PI material. However, these two kinds of alignment materials each have their respective disadvantages. As to the rubbing alignment PI material, dust particles, electrostatic residue, brush marks and other problems would possibly be resulted in, and a qualified rate of the product would be reduced. If the optical alignment PI material is used, the above problems can be solved. However, the optical alignment PI material has a poor heat resistance and aging resistance, and a weak ability to anchor LC molecules, and thus a quality of the panel will be affected. Moreover, the PI material itself has a high polarity and high water absorption, and properties thereof would be easily changed during storage and transportation procedures, which will result in non-uniform alignment of the liquid crystal. Furthermore, the PI material is expensive, and the deposition procedure of the PI material on a TFT-LCD is complicated, which will increase a cost of the panel.

Graphene has a good electric conductivity, heat conductivity, strength, and toughness, and thus it is an ideal material to replace ITO. If a special material can be added to graphene to obtain a new graphene material with a good electric conductivity and a good alignment effect, it has a great significance for LCD technology.

SUMMARY OF THE INVENTION

In order to solve the technical problem in the prior art, the present disclosure provides a graphene transparent conductive film with a electric conductivity and vertical alignment property. A vertical alignment agent is added to the graphene transparent conductive film. The vertical alignment agent can reduce a surface energy of liquid crystal molecules in a polymer matrix, increase a contact angle, so that the liquid crystal molecules can be aligned vertically.

According to a first aspect, the present disclosure provides a graphene transparent conductive film, which comprises graphene and a vertical alignment agent, wherein a general structural formula of the vertical alignment agent is R—$S_P$-$Q_n$. Q is a sulfonic acid group, and n is an integer in a range from 1 to 3. $S_p$ is a linking group, and a general structural formula thereof is —$(CH_2)_m$—, in which m is an integer in a range from 1 to 5, and one or more —$CH_2$— group(s) can be optionally substituted by a group selected from phenylene, aromatic condensed ring base, cycloalkylene, —O—, —S—, —CO—, —COO—, —OCO—, —OCOO—, —$OCH_2$—, —$CH_2O$—, —CH=CH—, —CF=CF—, —C≡C—, —CH=CH—COO—, and —OCO—CH=CH—. R is selected from substituted or unsubstituted $C_{3-20}$ linear or branched alkyl, in which one or more $CH_2$ group(s) can be optionally substituted by a group selected from —O—, —CONH—, —COO—, —OCO—, —CO—, and —CH=CH—, and one or more H atom(s) can be optionally substituted by F atom(s) or Cl atom(s).

According to a preferred embodiment of the present disclosure, in the general structural formula R—$S_P$-$Q_n$, when n is 1, the linking group $S_P$ contains at least two benzene rings or aromatic condensed rings.

According to the present disclosure, the vertical alignment agent can adsorb on a surface of the graphene by virtue of the sulfonic acid group therein, and liquid crystal molecules can be vertically aligned by virtue of long chain containing rigid group. It is discovered that, the larger the number of benzene rings or aromatic condensed rings in the vertical alignment agent, the better vertical alignment effect can be obtained.

According to some specific embodiments, the vertical alignment agent is one or more selected from

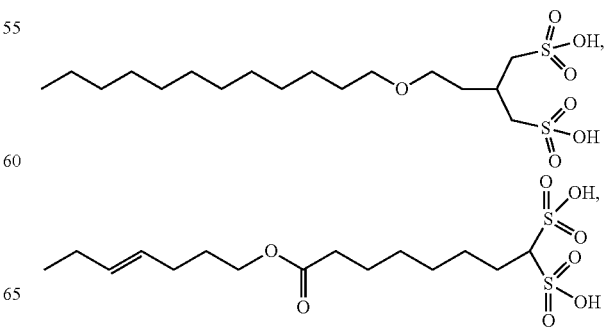

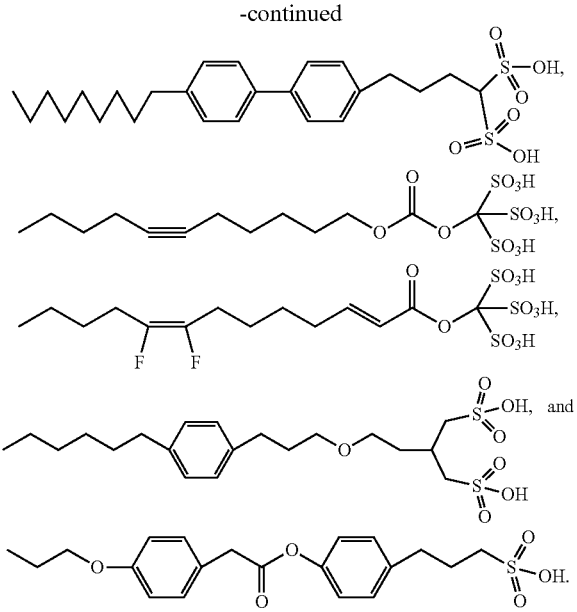

S1, mixing graphene, a surfactant, and water so as to obtain a graphene solution;

S2, adding a vertical alignment agent and PEDOT-PSS to the graphene solution so as to obtain a graphene transparent conductive film liquid; and S3, coating the graphene transparent conductive film liquid on a substrate, and removing water from the film liquid so as to obtain the graphene transparent conductive film.

According to the present disclosure, step S1 in the method is not specially defined and can be performed in a common way in the field. For example, graphene, the surfactant, and water can be mixed and treated by ultrasound so that they can be mixed together uniformly to obtain the graphene solution.

According to one preferred embodiment of the present disclosure, the graphene is not specially defined. Preferably, the graphene is in a powder shape, and a particle size thereof is in a range from 0.5 to 50 μm.

According to some preferred embodiments of the present disclosure, the surfactant is not specially defined, and commonly known surfactant in the field can be selected. The surfactant can be selected as anionic surfactant, cationic surfactant, nonionic surfactant and other surfactant well known in the field. The surfactant comprises at least one selected from a group consisting of fluorine-containing silane surfactant, stearic acid, sodium dodecyl sulfonate surfactant, quaternary ammonium surfactant, amino acid surfactant, betaine-type surfactant, fatty acid glycerides surfactant, fatty acid sorbitan surfactant, lecithin surfactant, and tween series surfactant.

According to some specific embodiments, the surfactant is preferably one selected from a group consisting of sodium dodecyl sulfate, ammonium dodecyl sulfate, sodium dodecyl sulfonate, sodium dodecyl benzene sulfonate, and sodium tetradecyl sulfate.

According to some embodiments of the present disclosure, a mass ratio of graphene, to the surfactant, and to water is in a range of 1:(50-500):(2000-10000), and preferably in a range of 1:(100-300):(3000-8000).

According to the method of the present disclosure, step S2 comprises adding the vertical alignment agent and PEDOT-PSS to the graphene solution, and performing ultrasound treatment on them to mix them together so as to obtain the graphene transparent conductive film liquid.

According to some specific embodiments, a mass ratio of the graphene solution, to the vertical alignment agent, and to PEDOT-PSS is in a range of 1:(0.1-1):(50-100), and preferably in a range of 1:0.5:(60-80).

PEDOT-PSS is poly(3,4-ethylenedioxythiophene)-poly (styrenesulfonate). PEDOT-PSS has a high electric conductivity, high mechanical strength, high visible light transmittance, and a good stability. Therefore, when PEDOT-PSS is added to the transparent conductive film, an electric conductivity of the transparent conductive film can be greatly improved.

According to some preferred embodiments of the present disclosure, a general structural formula of the vertical alignment agent is R—$S_P$-$Q_n$. Q is a sulfonic acid group, and n is an integer in a range from 1 to 3. $S_p$ is a linking group, and a general structural formula thereof is —$(CH_2)_m$—, in which m is an integer in a range from 1 to 5, and one or more —$CH_2$— group(s) can be optionally substituted by a group selected from phenylene, aromatic condensed ring base, cycloalkylene, —O—, —S—, —CO—, —COO—, —OCO—, —OCOO—, —OCH$_2$—, —CH$_2$O—, —CH=CH—, —CF=CF—, —C≡C—, —CH=CH—COO—, and —OCO—CH=CH—. R is selected from substituted or unsubstituted $C_{3\text{-}20}$ linear or branched alkyl, in which one or more CH$_2$ group(s) can be optionally substituted by a group selected from —O—, —CONH—, —COO—, —OCO—, —CO—, and —CH=CH—, and one or more H atom(s) can be optionally substituted by F atom(s) or Cl atom(s). In the general structural formula R—$S_P$-$Q_n$, when n is 1, the linking group $S_P$ contains at least two benzene rings or aromatic condensed rings.

According to some specific embodiments, the vertical alignment agent is one or more selected from

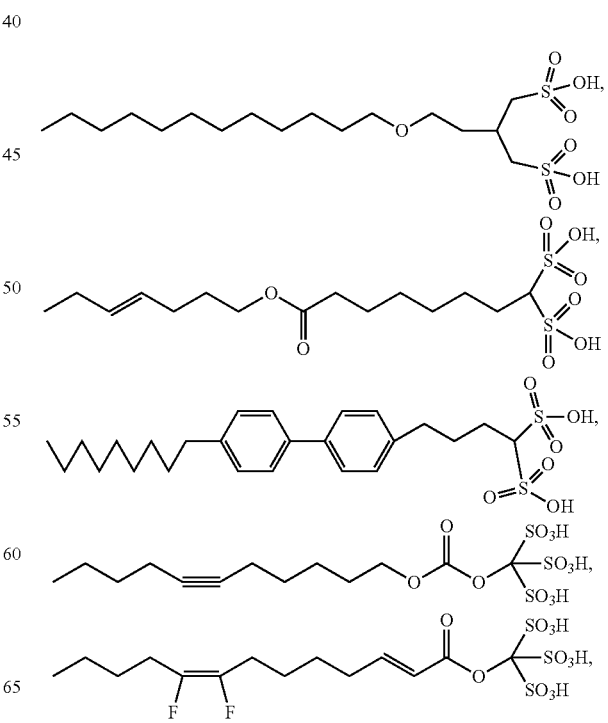

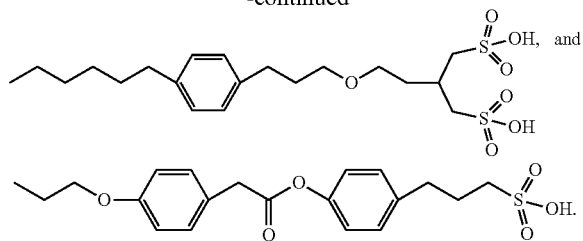

According to some preferred embodiments of the present disclosure, step S3 in the method is not specially defined and can be performed in a common way in the field. For example, the graphene transparent conductive film liquid can be coated on the substrate and then treated by heat to remove water therefrom so as to obtain the graphene transparent conductive film.

According to one embodiment of the present disclosure, a heat treatment temperature is in a range from 80° C. to 140° C., and a heat treatment time is in a range from 3 min to 10 min.

The water in the graphene transparent conductive film is removed through heat treatment. At the same time, the vertical alignment agent in the graphene solution experiences phase separation. That is, the sulfonic acid group is adsorbed in the graphene, and hydrophobic chain diffuses to a surface of the graphene. In this manner, the graphene transparent conductive film with a vertical alignment effect can be prepared.

According to a third aspect, the present disclosure provides a TFT-LCD, which comprises a first substrate, a second substrate, and a liquid crystal material arranged between the first substrate and the second substrate. The first substrate and the second substrate are coated with the aforesaid graphene transparent conductive film or the graphene transparent conductive film prepared by the aforesaid method.

According to the present disclosure, the vertical alignment agent is added to the graphene transparent conductive film. The vertical alignment agent can reduce the surface energy of liquid crystal molecules in the polymer matrix, increase the contact angle, so that the liquid crystal molecules can be aligned vertically. Meanwhile, the graphene transparent conductive film contains graphene and PEDOT-PSS, so that a high electric conductivity of the film can be ensured. In a word, the graphene transparent conductive film disclosed herein has a high electric conductivity and a good vertical alignment property at the same time.

BRIEF DESCRIPTION OF THE DRAWINGS

The accompanying drawings provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

Figure 1:
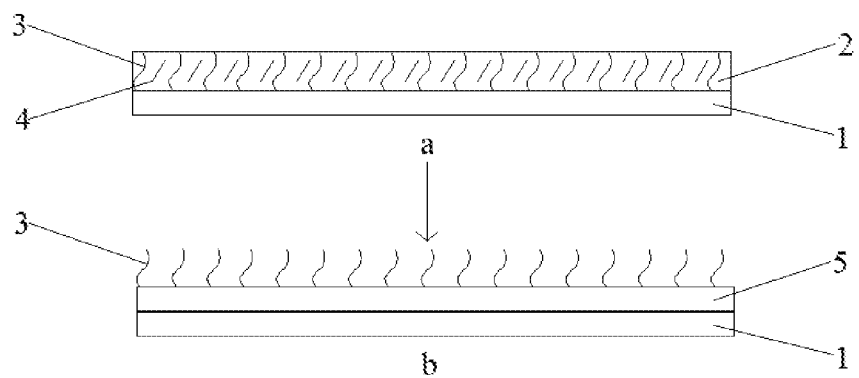
FIG. 1 schematically shows a preparing procedure of a graphene transparent conductive film according to the present disclosure.
Figure 2:
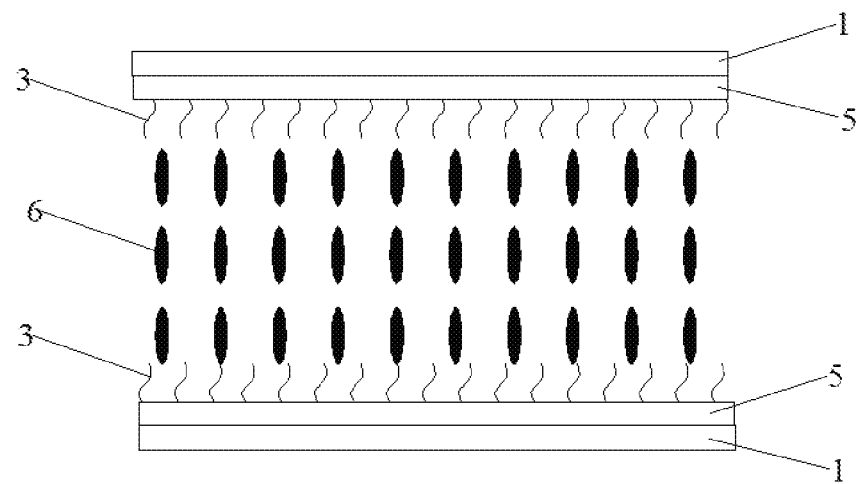
FIG. 2 schematically shows a structure of a liquid crystal display device according to the present disclosure.

The technical solutions of the present disclosure will be further illustrated hereinafter with reference to specific embodiments.

Embodiment 1

(1) Materials are prepared with a mass ratio as follows:

| | |
|---|---|
| graphene powder | 1; |
| surfactant | 200; and |
| water | 5000. |

The graphene powder, surfactant, and water are mixed and treated by ultrasound, so that they can be mixed uniformly to obtain graphene solution. The surfactant is sodium dodecyl sulfonate.

(2) Materials are prepared with a mass ratio as follows:

| | |
|---|---|
| graphene solution | 1; |
| vertical alignment agent | 0.5; and |
| PEDOT-PSS | 60. |

The vertical alignment agent and PEDOT-PSS are added to the graphene solution, and they are treated by ultrasound to be mixed uniformly so as to obtain graphene transparent conductive film liquid. The vertical alignment agent is

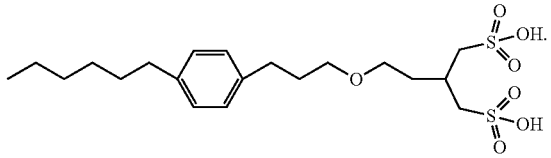 [SMILES: CCCCCCc1ccc(CCCOCCC(CS(=O)(=O)O)CS(=O)(=O)O)cc1]

(3) The graphene transparent conductive film liquid is coated on a TFT substrate and a CF substrate, and then heated to 120° C. and baked for 3 min to remove water from the graphene film so as to obtain the graphene transparent conductive film with a vertical alignment effect.

(4) The CF substrate and the TFT substrate are fitted together in a vacuum environment, and then sealed by a sealant. The sealant is cured by ultraviolet to obtain a liquid crystal cell. The liquid crystal cell is irradiated by ultraviolet to obtain a TFT-LCD.

Embodiment 2

(1) Materials are prepared with a mass ratio as follows:

| | |
|---|---|
| graphene powder | 1; |
| surfactant | 100; and |
| water | 8000. |

The graphene powder, surfactant, and water are mixed and treated by ultrasound, so that they can be mixed uniformly to obtain graphene solution. The surfactant is sodium dodecyl sulfate.

(2) Materials are prepared with a mass ratio as follows:

| graphene solution | 1; |
|---|---|
| vertical alignment agent | 0.1; and |
| PEDOT-PSS | 80. |

The vertical alignment agent and PEDOT-PSS are added to the graphene solution, and they are treated by ultrasound to be mixed uniformly so as to obtain graphene transparent conductive film liquid. The vertical alignment agent is

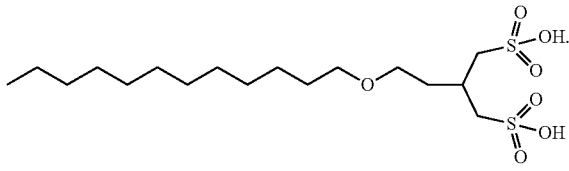 [SMILES: CCCCCCCCCCCCOCCC(CS(=O)(=O)O)CS(=O)(=O)O]

(3) The graphene transparent conductive film liquid is coated on a TFT substrate and a CF substrate, and then heated to 100° C. and baked for 5 min to remove water from the graphene film so as to obtain the graphene transparent conductive film with a vertical alignment effect.

(4) The CF substrate and the TFT substrate are fitted together in a vacuum environment, and then sealed by a sealant. The sealant is cured by ultraviolet to obtain a liquid crystal cell. The liquid crystal cell is irradiated by ultraviolet to obtain a TFT-LCD.

Embodiment 3

(1) Materials are prepared with a mass ratio as follows:

| graphene powder | 1; |
|---|---|
| surfactant | 500; and |
| water | 2000. |

The graphene powder, surfactant, and water are mixed and treated by ultrasound, so that they can be mixed uniformly to obtain graphene solution. The surfactant is sodium dodecyl benzene sulfonate.

(2) Materials are prepared with a mass ratio as follows:

| graphene solution | 1; |
|---|---|
| vertical alignment agent | 0.3; and |
| PEDOT-PSS | 75. |

The vertical alignment agent and PEDOT-PSS are added to the graphene solution, and they are treated by ultrasound to be mixed uniformly so as to obtain graphene transparent conductive film liquid. The vertical alignment agent is

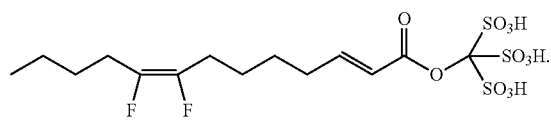 [SMILES: CCCC/C(F)=C(/F)CCCC/C=C/C(=O)OC(S(=O)(=O)O)(S(=O)(=O)O)S(=O)(=O)O]

(3) The graphene transparent conductive film liquid is coated on a TFT substrate and a CF substrate, and then heated to 80° C. and baked for 10 min to remove water from the graphene film so as to obtain the graphene transparent conductive film with a vertical alignment effect.

(4) The CF substrate and the TFT substrate are fitted together in a vacuum environment, and then sealed by a sealant. The sealant is cured by ultraviolet to obtain a liquid crystal cell. The liquid crystal cell is irradiated by ultraviolet to obtain a TFT-LCD.

Embodiment 4

(1) Materials are prepared with a mass ratio as follows:

| graphene powder | 1; |
|---|---|
| surfactant | 50; and |
| water | 10000. |

The graphene powder, surfactant, and water are mixed and treated by ultrasound, so that they can be mixed uniformly to obtain graphene solution. The surfactant is ammonium dodecyl sulfate.

(2) Materials are prepared with a mass ratio as follows:

| graphene solution | 1; |
|---|---|
| vertical alignment agent | 0.8; and |
| PEDOT-PSS | 100. |

The vertical alignment agent and PEDOT-PSS are added to the graphene solution, and they are treated by ultrasound to be mixed uniformly so as to obtain graphene transparent conductive film liquid. The vertical alignment agent is

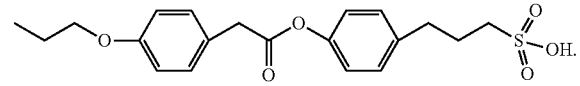

(3) The graphene transparent conductive film liquid is coated on a TFT substrate and a CF substrate, and then heated to 90° C. and baked for 8 min to remove water from the graphene film so as to obtain the graphene transparent conductive film with a vertical alignment effect.

(4) The CF substrate and the TFT substrate are fitted together in a vacuum environment, and then sealed by a sealant. The sealant is cured by ultraviolet to obtain a liquid crystal cell. The liquid crystal cell is irradiated by ultraviolet to obtain a TFT-LCD.

Embodiment 5

(1) Materials are prepared with a mass ratio as follows:

| graphene powder | 1; |
|---|---|
| surfactant | 300; and |
| water | 3000. |

The graphene powder, surfactant, and water are mixed and treated by ultrasound, so that they can be mixed uniformly to obtain graphene solution. The surfactant is sodium tetradecyl sulfate.

(2) Materials are prepared with a mass ratio as follows:

| graphene solution | 1; |
|---|---|
| vertical alignment agent | 1; and |
| PEDOT-PSS | 50. |

The vertical alignment agent and PEDOT-PSS are added to the graphene solution, and they are treated by ultrasound to be mixed uniformly so as to obtain graphene transparent conductive film liquid. The vertical alignment agent is

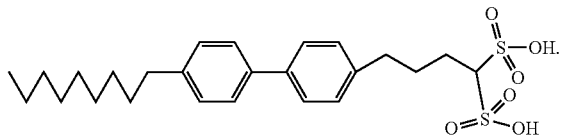 [SMILES: CCCCCCCCCc1ccc(-c2ccc(CCCC(S(=O)(=O)O)S(=O)(=O)O)cc2)cc1]

(3) The graphene transparent conductive film liquid is coated on a TFT substrate and a CF substrate, and then heated to 140° C. and baked for 6 min to remove water from the graphene film so as to obtain the graphene transparent conductive film with a vertical alignment effect.

(4) The CF substrate and the TFT substrate are fitted together in a vacuum environment, and then sealed by a sealant. The sealant is cured by ultraviolet to obtain a liquid crystal cell. The liquid crystal cell is irradiated by ultraviolet to obtain a TFT-LCD.

The display effects of the TFT-LCDs manufactured in embodiments 1 to 5 are tested, and the test results are shown in Table 1. It can be seen from Table 1 that, the LCD manufactured in the present disclosure shows a dark color when no power is applied thereon; the liquid crystal has a pre-tilt angle in a range from 88.50 to 89.20; and the LCD has a good dark state.

TABLE 1

| Display mode | Dark state | Pre-tilt angle |
|---|---|---|
| Embodiment 1 | Good | 89.0° |
| Embodiment 2 | Good | 88.6° |
| Embodiment 3 | Good | 88.5° |
| Embodiment 4 | Good | 89.2° |
| Embodiment 5 | Good | 89.1° |

Any value mentioned in the present disclosure includes all the values of a unit being added each time from a minimum value to a maximum value if there is only an interval of two units between any minimum value and any maximum value. For example, if it is stated that the amount of a component, or a value of variables such as temperature, pressure, and time is from 50 to 90, this means in the description that it recites values of from 51 to 89, 52 to 88 . . . 69 to 71, and 70 to 71. For non-integer values, 0.1, 0.01, 0.001 or 0.0001 can be considered as a unit. These are only a few specific examples. In this application, all possible combinations of numerical values between the minimum value and the maximum value recited in a similar manner are considered to have been disclosed.

It should be noted that, the above embodiments are only used for illustrating, rather than restricting the present disclosure. The present disclosure is illustrated in detail in combination with specific embodiments hereinabove, but it can be understood that, the words used are descriptive and explanatory ones, rather than restrictive ones. Changes can be made to the present disclosure according to the protection scopes of the claims recited herein, and amendments can be made to the present disclosure as long as they do not go beyond the spirit and scope thereof. Although the present disclosure described herein relates to specific methods, materials, and embodiments, it does not mean that the present disclosure is limited to the particular embodiments disclosed therein. Instead, the present disclosure can be extended to all other methods and applications having same functions.

LIST OF REFERENCE SIGNS 1 substrate;
2 graphene transparent conductive film liquid;
3 vertical alignment agent;
4 surfactant;
5 graphene; and
6 liquid crystal molecules.

The invention claimed is:

1. A method for manufacturing a graphene transparent conductive, vertical alignment film for liquid crystal, comprising steps of:

S1, mixing graphene, a surfactant, and water so as to obtain a graphene solution;

S2, adding a vertical alignment agent for liquid crystal and PEDOT-PSS to the graphene solution so as to obtain a graphene transparent conductive film liquid; and S3, coating the graphene transparent conductive film liquid on a substrate, and removing water from the film liquid, obtaining the graphene transparent conductive, vertical alignment film for liquid crystal, wherein a general structural formula of the vertical alignment agent for liquid crystal, is R—$S_p$-$Q_n$, wherein Q is a sulfonic acid group, and n is an integer in a range from 1 to 3;

wherein $S_p$ is a linking group, and a general structural formula thereof is —$(CH_2)_m$—, in which m is an integer in a range from 1 to 5, one or more —$CH_2$— group(s) are each optionally substituted by a group selected from phenylene, aromatic condensed ring base, cycloalkylene, —O—, —S—, —CO—, —COO—, —OCO—, —OCOO—, —OCH$_2$—, —CH$_2$O—, —CH=CH—, —CF=CF—, —C=C—, —CH=CH—COO—, and —OCO—CH=CH—;

wherein R is a hydrophobic chain selected from substituted or unsubstituted $C_{3-20}$ linear or branched alkyl, in which one or more $CH_2$ group(s) are each optionally substituted by a group selected from —O—, —CONH—, —COO—, —OCO—, —CO—, and —CH=CH—, and one or more H atom(s) are each optionally substituted by F atom(s) or CI atom(s), wherein when n is 1, the linking group Sp contains at least two benzene rings or aromatic condensed rings, and wherein the sulfonic group(s) Q(s) of the vertical alignment agent for liquid crystal are each adsorbed in the graphene, and the hydrophobic chain R of the vertical alignment agent for liquid crystal is at a surface of the graphene transparent conductive, vertical alignment film for liquid crystal.

2. The method according to claim 1, wherein step S1 comprises mixing graphene, the surfactant, and water, and performing ultrasound treatment on them to mix them together so as to obtain the graphene solution.

3. The method according to claim 2, wherein a mass ratio of graphene, to the surfactant, and to water is in a range of 1:(50-500):(2000-10000).

4. The method according to claim 1, wherein step S2 comprises adding the vertical alignment agent for liquid crystal and PEDOT-PSS to the graphene solution, and performing ultrasound treatment on them to mix them together so as to obtain the graphene transparent conductive film liquid.

5. The method according to claim 4, wherein a mass ratio of the graphene solution, to the vertical alignment agent for liquid crystal, and to PEDOT-PSS is in a range of 1:(0.1-1):(50-100).

6. The method according to claim 1, wherein step S3 comprises coating the graphene transparent conductive film liquid on the substrate, and performing heat treatment on the film liquid to remove water therefrom so as to obtain the graphene transparent conductive, vertical alignment film for liquid crystal.

7. The method according to claim 6, wherein a heat treatment temperature is in a range from 80° C. to 140° C., and a heat treatment time is in a range from 3 min to 10 min.

* * * * *